United States Patent Office 3,532,682
Patented Oct. 6, 1970

3,532,682
5-ARYLAZO-PYRIMIDINE DYESTUFFS
Hans Ackerman, Werner Bossard, Jacques Voltz, and Hans Wegmuller, Riehen, Switzerland, assignors to J. R. Geigy A.G., Basel, Switzerland
No Drawing. Filed Nov. 8, 1967, Ser. No. 681,587
Claims priority, application Switzerland, May 2, 1967, 6,345/67
Int. Cl. C09b 29/36; D06p 1/02
U.S. Cl. 260—154                                    17 Claims

ABSTRACT OF THE DISCLOSURE

Dispersible dyestuffs which are 5-arylazo-pyrimidines wherein the carbon atoms in 2-, 4- and 6-positions of the pyrimidine ring are occupied by amino groups at least one of which is substituted by an unsubstituted or non-ionogenically substituted phenyl radical and at least one other of which amino groups is substituted by hydroxyalkyl, certain substituted oxyalkyl, or acyloxyalkyl groups; such dyestuffs being distinguished by good affinity especially for polyester fibers, affording dyeings on these fibers which have excellent fastness properties; processes for dyeing polyester fibers with the aforesaid novel dyestuffs; and compositions containing polyester fiber material and such novel dyestuffs.

CROSS REFERENCE TO RELATED APPLICATION

This application is a continuation-in-part of our pending patent application Ser. No. 567,057 filed on July 22, 1966.

DESCRIPTION OF THE INVENTION

The present invention concerns new, slightly or very slightly water-soluble azo dyestuffs which can be used as dispersible dyes, processes for the production thereof, processes for the dyeing therewith of hydrophobic organic fiber materials, particularly of textile fibers made from linear high molecular esters of aromatic polycarboxylic acids with polyvalent alcohols or from cellulose esters and, as industrial products, the fiber materials dyed with the new dyestuffs.

Difficulty soluble azo dyestuffs which can be dispersed in water containing no ionogenic groups forming salt in water of formula:

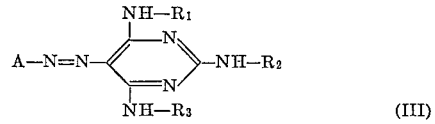

wherein:

A represents the radical of an aromatic homocycle or heterocycle which can contain non-ionogenic substituents including phenyl azo groups, and
of $R_1$, $R_2$ and $R_3$, one R represents an unsubstituted or non-ionogenically substituted phenyl radical and the other R's each represent hydrogen or an unsubstituted or nonionogenically substituted alkyl, cycloalkyl or phenylalkyl group,
have been described in our patent application Ser. No. 567,057, supra.

It has now been found that azo pyrimidine dyestuffs are obtained which are distinguished by particularly advantageous properties—for example, good fastness to sublimation, colour strength and purity of the polyester dyeings attained therewith, and excellent buildup of the dyes on polyester fibers, when the diazonium compound of an amine of formula:

A—NH$_2$         (I)

is coupled with a coupling component of formula

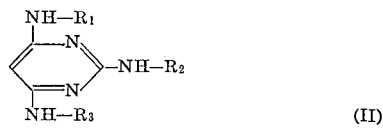

to form an azo dyestuff of formula:

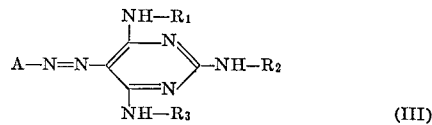

In this process the starting materials are so chosen that the azo dyestuff obtained is free from ionogenic, salt-forming groups, i.e. it contains neither groups which dissociate acid in water such as sulfonic acid, carboxylic acid or phosphoric acid groups, nor onium groups such as ammonium or sulphonium groups.

In the Formulas I, II and III:

A represents an optionally substituted carbocyclic or heterocyclic aryl radical which can also contain arylazo groups,
and of $R_1$, $R_2$ and $R_3$, one R represents an optionally substituted phenyl radical, another R represents a radical of the formula -alk-O-Z wherein -alk- represents an optionally substituted alkylene radical and Z represents hydrogen, an acyl radical or an optionally substituted hydrocarbon radical, and the third R represents hydrogen or an optionally substituted alkyl, cycloalkyl or phenylalkyl radical.

Preferred azo dyestuffs produced according to the invention are coupling products of Formula III which are produced by using diazonium compounds of amines of Formula I wherein A:

(a) represents a phenyl radical in o- and/or p-position to the azo group, which phenyl radical contains at least one non-ionogenic, electron attracting substituent, or
(b) it represents an optionally non-ionogenically substituted benzothiazolyl-(2) radical, or
(c) it represents an optionally non-ionogenically substituted 4-phenylazophenyl radical.

In order to attain the desired sublimation fastness properties and, at the same time, to provide excellent buildup and levelling power on the aforesaid fibers, one R in the azo pyrimidine dyestuffs according to the invention must be an optionally non-ionogenically substituted phenyl radical and another R must be the group -alk-O-Z.

As non-ionogenic substituents of the phenyl radical, for example, the substituents conventionally employed in diazo components can be used, particularly lower alkyl or lower alkoxy groups, and halogens.

The chain of the alkylene group -alk- can be straight or branched; in the former case it is preferably the 1,2-ethylene or 1,3-propylene group, in the latter case it is the 1,2-propylene or 1,2-butylene group. Such divalent radicals can be substituted, e.g. by phenyl, hydroxy or low alkoxy groups such as the methoxy or ethoxy group.

Z, as acyl radical is, particularly, a lower unsubstituted or non-ionogenically substituted alkanoyl group. The alkanoyl radical has, advantageously, two to four carbon atoms. The alkanoyl group can contain, e.g. halogens such as chlorine or bromine, or lower alkoxy groups such as the methoxy or ethoxy group as non-ionogenic substituents.

Z, as hydrocarbon radical represents, e.g. a straight or branched chain alkyl radical having, a preferably, 1 to 4 carbon atoms, a cycloalkyl radical such as the cyclohexyl or methylcyclohexyl radical, an aralkyl radical, particularly a phenylalkyl radical such as the benzyl radical, or a carbocyclic aryl radical such as the phenyl radical. If these hydrocarbon radicals are substituted, then examples of substituents are halogens such as fluorine, chlorine or bromine, cyano groups, hydroxyl groups or lower alkoxy groups or phenoxy groups.

If one of $R_1$, $R_2$ and $R_3$ represents an alkyl radical, this can contain up to 12 and, in direct chain preferably 1 to 5, carbon atoms and the chain can be normal or branched. If this alkyl radical is substituted, then examples of substituents are the hydroxyl group, alkoxy groups such as unsubstituted alkoxy, alkoxyalkoxy or alkoxyalkoxyalkoxy groups or alkoxycarbonyl groups in each of which the alkoxy unit preferably has 1 to 4 carbon atoms, also acyloxy groups, particularly lower alkanoyloxy groups such as the acetyloxy or propionyloxy group, phenyl, phenoxy, cyano groups or halogens such as fluorine, chlorine or bromine. Examples of cycloalkyl or phenylalkyl groups symbolized by $R_1$, $R_2$ or $R_3$ are the cyclohexyl or methylcyclohexyl groups or the benzyl group, the benzene nucleus of which can contain the non-ionogenic substituents, particularly halogens or lower alkyl or alkoxy groups mentioned hereinbefore in the description of A.

Dyestuffs which, among other things are distinguished by their excellent buildup on polyglycol terephthalate fibers as well as by extraordinary stability in the boiling dyebath and, in addition are very fast to light and sublimation, are derived from coupling components of formula:

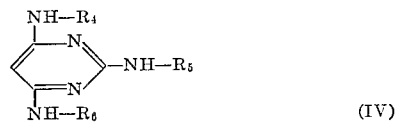

(IV)

wherein of $R_4$, $R_5$ and $R_6$, one R represents an unsubstituted or non-ionogenically substituted phenyl radical, another R represents a radical of the formula -alkyl-O-Z wherein -alk- and Z have the meanings given above, and the third R represents a lower alkyl radical optionally substituted by acyloxy or alkoxy groups.

Of special importance because of their good accessibility are mono-azo dyestuffs according to the invention which fall under the formula:

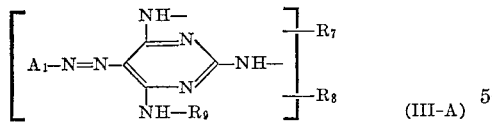

(III-A)

wherein $A_1$ represents:

(a) A phenyl radical substituted as follows:
(i) By a first substituent selected from nitro, cyano, fluorine, chlorine, bromine, trifluoromethyl, lower alkanoyl, benzoyl, lower alkylsulfonyl, phenylsulfonyl, lower alkylphenylsulfonyl, phenoxysulfonyl, lower alkylphenoxysulfonyl, lower alkoxycarbonyl, hydroxy-lower alkoxycarbonyl, or a substituent of the formula

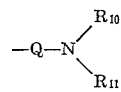

wherein

Q represents —$SO_2$— or —CO—

$R_{10}$ represents hydrogen, lower alkyl, hydroxy-lower alkyl, lower alkoxy-lower alkyl, phenyl, cyclohexyl or benzyl, and $R_{11}$ represents hydrogen, lower alkyl or hydroxy-lower alkyl;

(ii) By a second substituent selected from hydrogen, nitro, lower alkyl, lower alkoxy, phenoxy, chlorine and bromine; and
(iii) By a third substituent selected from hydrogen, chlorine and bromine;
(b) A Benzothiazolyl-(2) radical which is unsubstituted or substituted by chlorine, bromine, nitro, cyano, thiocyano, lower alkyl, lower alkoxy, lower alkylsulfonyl, or a grouping

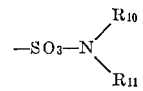

wherein $R_{10}$ and $R_{11}$ represent lower alkyl;

And disazo dyestuffs falling under Formula III-A wherein $A_1$ represents 4-phenylazo-phenyl which is unsubstituted or substituted by lower alkyl or lower alkoxy.

In Formula III-A, the remaining symbols have the following meanings for both monoazo and disazo dyestuffs:

$R_7$ represents phenyl having substituents selected from hydrogen, lower alkyl, lower alkoxy, chlorine, bromine and cyano;

One of $R_8$ and $R_9$ represents alkyl of from 2 to 5 carbon atoms substituted by the group —O—$R_{12}$ which represents hydroxy, lower alkoxy, lower alkoxy-lower alkoxy, hydroxy-lower alkoxy, cyclohexyloxy, phenyl-lower alkoxy, phenoxy, lower alkyl-phenoxy, alkanoyloxy of from 2 to 5 carbon atoms, benzoyloxy, lower alkoxycarbonyloxy, phenylsulfonyloxy, or lower alkyl-phenylsulfonyloxy, and The other one of $R_8$ and $R_9$ represents the same as the first one defined, supra, or hydrogen, alkyl of from 1 to 12 carbon atoms, cyclohexyl or phenyl-lower alkyl.

Preferably, one of the first and second substituents of a phenyl radical $A_1$ as defined under (a) supra is in o- and the other in p-position to the adjoining azo bridge.

More preferred because of especially good fastness properties of their dyeing on polyester fibres are those monoazo dyestuffs falling under Formula III-A having the last-mentioned preferred substitution in the coupling component and, as diazo component the grouping of the formula:

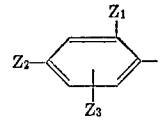

(Ia)

wherein:

one of $Z_1$ and $Z_2$ represents nitro,
the other of these Z's represents hydrogen, nitro, cyano, chlorine, bromine or lower alkyl-sulfonyl or lower alkoxy carbonyl, and
$Z_3$ represents hydrogen, chlorine or bromine.

Still more preferred in this last-defined subclass of dyestuffs according to the invention due to their particularly good light fastness are those in which $A_1$ represents:

2-cyano-4-nitro-phenyl, 2-nitro-phenyl, 4-nitro-phenyl, 2,4-dinitrophenyl, 2-chloro-4-nitrophenyl, 2,4-dinitro-6-chloro-phenyl, 2-bromo-4-nitro-phenyl, 2,4-dinitro-6-bromo-phenyl, 2-nitro-4-chloro-phenyl, 2,6-dichloro-4-nitro-phenyl, 2-nitro-4-methylsulfonyl-phenyl, and 2-nitro-4-ethylsulfonyl-phenyl, and similar groupings, all of which fall under the formula

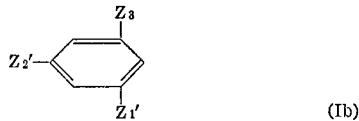

wherein:

$Z_1'$ represents hydrogen, nitro, cyano, chloro or bromo,
$Z_2'$ represents nitro, chloro, bromo or lower alkylsulfonyl, but preferably nitro, and
$Z_3$ has the aforesaid meaning.

Most preferred are those dyestuffs having the meaning of $A_1$ defined in Formula Ia, and especially in Formula Ib, supra, which in their coupling components have the following substitution:

$R_7$ represents phenyl having substituents selected from hydrogen, lower alkyl and lower alkoxy, most preferably, however, hydrogen, methyl and methoxy;

one of $R_8$ and $R_9$ represents lower alkyl substituted by hydroxyl, lower alkoxy or alkanoyloxy of from 2 to 5 carbon atoms, and the other R of the pair of $R_8$ and $R_9$ represents lower alkyl which is unsubstituted or substituted by lower alkoxy and/or alkanoyloxy of from 2 to 5 carbon atoms.

The dyestuffs of Formula III-A as defined above are of particularly high affinity for polyethylene glycol terephthalate fibers, and the dyeings obtained therewith on the latter fibers are of especially satisfactory fastness to light.

In this application and the appended claims the term "lower" (or "low") in connection with an aliphatic radical means a group containing not more than 5 carbon atoms.

As a final aspect of the invention there are provided disazo dyestuffs of the formula:

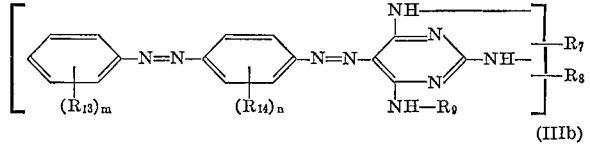

wherein:

$R_7$ represents phenyl having substituents selected from hydrogen, lower alkyl, lower alkoxy, chlorine, bromine and cyano;

one of $R_8$ and $R_9$ represents alkyl of from 2 to 5 carbon atoms substituted by the group $-O-R_{12}$ which group represents hydroxy, lower alkoxy, lower alkoxy-lower alkoxy, hydroxy-lower alkoxy, cyclohexyloxy, phenyl-lower alkoxy, phenoxy, lower alkyl-phenoxy, alkanoyloxy of from 2 to 5 carbon atoms, benzoyloxy, lower alkoxycarbonyloxy, phenyl-sulfonyloxy, or lower alkyl-phenyl-sulfonyloxy, and the other one of $R_8$ and $R_9$ represents the same as the first one defined, supra, or hydrogen, alkyl of from 1 to 12 carbon atoms, cyclohexyl or phenyl-lower alkyl, each of $R_{13}$ and $R_{14}$ represents hydrogen, lower alkyl, or lower alkoxy, $m$ represents a number from 1 to 3, and
$n$ represents a number from 1 to 2.

The 2,4,6-triamino-pyrimidine compounds of Formula II usable according to the invention as coupling components, are produced by reacting the three chlorine atoms of 2,4,6-trichloropyrimidine one after the other with ammonia or with primary aliphatic, cycloaliphatic, araliphatic or carbocyclic-aromatic amines as defined. Advantageously less reactive amines are used in the first step and in the second and third step, ammonia and/or easily reacting, more strongly basic amines are used in any order desired. The products resulting from the first step are generally mixtures of isomers of 2-amino-4,6-dichloro-pyrimidines and 4-amino-2,6-dichloro-pyrimidines which can be separated, if desired, by recrystallisation or by chromatographic adsorption, e.g. on aluminium oxide. Preferably however, the mixtures of isomers are used as they yield mixtures of azo pyrimidine dyestuffs according to the invention which are distinguished by very good buildup.

The step-wise reaction is performed, e.g. in aqueous organic or organic-aqueous solution or dispersion, optionally in the presence of acid binding agents such as alkali and alkaline earth carbonates or oxides, or tertiary nitrogen bases. Examples of suitable organic solvents are alcohols such as methanol or ethanol, ethylene glycol monomethyl ether or monoethyl ether, preferably however, aliphatic ketones such as acetone, methylethyl ketone or methylisobutyl ketone, cyclic ethers, e.g. dioxane or tetrahydrofuran, or optionally halogenated or nitratated aromatic hydrocarbons such as toluene, xylenes, chloro-benzene or nitrobenzene.

The first chlorine atom of the 2,4,6-trichloro-pyrimidine is reacted at low temperatures, advantageously at 20–60° C., the second chlorine atom is reacted at moderate temperatures, preferably at 70–100° C., and the third chlorine atoms is reacted at higher temperatures, preferably between 100 and 180° C., optionally in a closed reaction vessel.

If, in the pyrimidine coupling components of Formula II usable according to the invention, of $R_1$, $R_2$ and $R_3$ one R represents a radical of the formula -alk-OH and another R represents an alkyl radical which optionally contains one or more hydroxyl groups as non-ionogenic groups, then these hydroxyl groups can be subsequently acylated. For this purpose, the anhydrides of low carboxylic acids such as acetanhydride or propionic acid anhydride, the acyl chlorides and bromides of the aliphatic and aromatic series, e.g. acetyl, propionyl, butyryl or benzoyl chloride or bromide, also chloroformic or bromoformic acid esters, particularly chloroformic or bromoformic acid methyl or ethyl ester, phenyl sulfonic acid chloride or p-methylphenylsulfonic acid chloride are used as acylating agents.

A modification of the process according to the invention for the production of difficulty water soluble azo dyestuffs of Formula III in which of $R_1$, $R_2$ and $R_3$ at least one R represents an alkyl radical substituted by acyloxy groups, consists in reacting a compound of Formula V

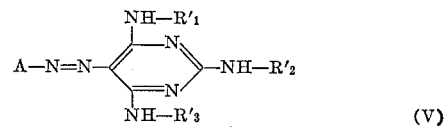

wherein of $R_1'$, $R_2'$ and $R_3'$, one R' represents an optionally substituted phenyl radical, another R' represents a radical of the formula -alk-OH, and the third R' represents the same as the second R', an unsubstituted alkyl group, or substituted alkyl group different therefrom or an optionally substituted cycloalkyl or phenylalkyl group, and A and -alk- have the meanings given above, with an acylating agent, the starting materials being so chosen that the final dyestuff contains no ionogenic groups forming salt in water.

Azo compounds of Formula V are obtained, e.g. by coupling the diazonium compound of an amine of Formula I with the corresponding pyrimidine coupling component, the coupling being performed as described further below.

Acylating agents suitable for the acylation of azo compounds of Formula V usable according to the invention are, e.g. those mentioned above.

The acylation is performed advantageously at a raised temperature in a suitable organic solvent such as glacial acetic acid, chlorobenzene or dioxane, optionally in the presence of an acid binding agent such as sodium acetate, pyridine or magnesium oxide.

The products resulting from the condensation are generally mixtures of isomers of 2-phenylamino-4,6-dichloro-pyrimidines and 4-phenylamino-2,6-dichloro-pyrimidines, which can be separated by fractional crystallization or chromatographic techniques. Often, however, it is preferred to use the crude isomer mixtures as coupling components, because the resulting composite dyes afford superior fastness properties.

The coupling of the diazonium compounds of an amine of Formula I with a coupling component of Formula II is performed by the usual methods, preferably in mineral acid to weakly acid aqueous medium, more especially at a pH of 4–4.5. When coupling in a mineral acid medium, the acid is advantageously gradually buffered, for example, with alkali metal salts of lower fatty acids. It is also possible to simultaneously couple a suitable diazonium compound with a mixture of isomeric coupling components usable according to the invention.

The dyestuffs according to the invention are finely dispersed by milling with surface active dispersing agents. Suitable dispersing agents are, e.g. anionic salts such as alkali metal salts of sec. higher alkylaryl sulfonates, alkali metal salts of condensation products of formaldehyde and naphthalenesulphonic acids, lignin sulfonates, or non-ionogenic dispersing agents such as fatty alcohol polyglycol ethers.

Dyestuffs according to the invention possess a very good drawing power and good buildup onto polyglycol terephthalate fibers and, on these fibers, produce strongly coloured greenish yellow, yellow, orange, scarlet and red to bordeaux coloured dyeings which are excellently fast to washing, milling, sublimation, light, rubbing, perspiration, solvents, cross-dyeing, decatising, gas fading and industrial fumes. They form very stable dispersions and, moreover, it is particularly remarkable that when dyeing tightly twisted polyester yarns in the form of cheeses or of polyester slubbing, the azo dyestuffs according to the invention do not tend to form deposits.

In addition, the dyestuffs according to the invention are also suitable for the dyeing of polyolefins, particularly polypropylene fibers.

The dyestuffs which can be obtained according to the invention, particularly the mixtures of isomers, differ from previously known dyestuffs of similar constitution by their very good drawing power and buildup onto polyglycol terephthalate fibers. In addition, dyeings attained with the dyestuffs according to the invention have, in most cases, substantially better fastness to light and sublimation.

Particularly valuable dyestuffs according to the invention which are distinguished by good fastness to sublimation, excellent fastness to light as well as by optimal drawing power, buildup and levelling power, are derived from mixtures of isomers of the formulas

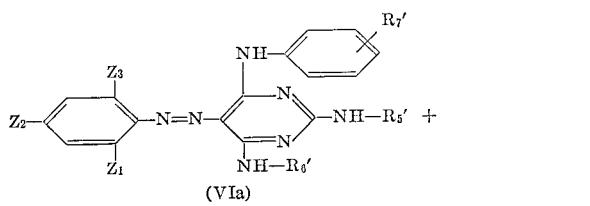
(VIa)

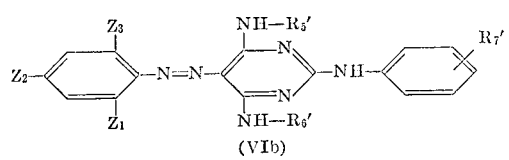
(VIb)

wherein:
of $Z_1$, $Z_2$ and $Z_3$, one Z represents the nitro group, a second Z represents hydrogen, the nitro, cyano, methylsulphonyl or ethylsulphonyl group, chlorine or bromine, and the third Z represents hydrogen, chlorine or bromine, $R_7'$ represents hydrogen, the methyl or methoxy group, and of $R_5'$ and $R_6'$ one R' represents a low alkyl group substituted by hydroxyl, lower alkoxy or alkanoyloxy of from 2 to 5 carbon atoms, and the other R' represents lower alkyl which is unsubstituted or substituted by alkanoyloxy of from 2 to 5 carbon atoms or lower alkoxy.

The following non-limitative examples illustrate the invention further. The temperatures are given therein in degrees centigrade. "Polyglycol terephthalate" represents the products known by the trade names Terylene, Vycron, Dacron and Trevira. Parts and percentages are given by weight unless expressly stated otherwise.

Example 1

21.8 g. of 1-amino-2,4-dinitro-6-chlorobenzene are dissolved in 200 g. of concentrated sulphuric acid and, at 20–30°, the solution is diazotised with an amount of nitrosyl sulphuric acid corresponding to 6.9 g. of sodium nitrite. The diazonium salt solution so obtained is added dropwise, at 0–5°, to a solution of a mixture consisting of 23 g. of 2-ethylamino-4-phenylamino-6-β-hydroxyethylamino-pyrimidine and 4.3 g. of 2-phenylamino-4-ethylamino-6-β-hydroxyethylamino-pyrimidine in 400 g. of 80% acetic acid and 300 g. of water. On completion of the coupling, the dark red coloured precipitate formed, the composition of which corresponds to the formulae:

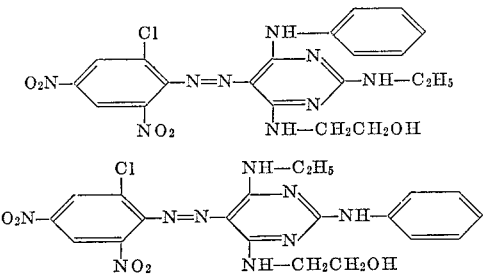

is separated by filtration, washed with water and dried in the usual way. 10 g. of the dyestuff mixture so obtained is brought into a finely dispersable form by milling with 20 g. of a lignin sulphonate.

Polyglycol terephthalate fibres can be dyed in pure red shades with this dyestuffs mixture, optionally in the presence of a carrier such as trichlorobenzene. The dyeings obtained have very good fastness to washing, rubbing, light and sublimation.

The mixture used in this example as coupling component consisting of 2-ethylamino-4-phenylamino-6-β-hydroxyethylamino-pyrimidine and 2-phenylamino-4-ethylamino-6-β-hydroxyethylamino-pyrimidine is obtained, e.g. by reacting 2,4,6-trichloro-pyrimidine with one equivalent of aniline at 40–50°, condensing the mixture of 4-anilino-2,6-dichloro-pyrimidine and 2-anilino-4,6-dichloro-pyrimidine resulting therefrom with excess ethylamine at 80–90° to form a mixture consisting of 2-ethylamino-4-phenylamino-6-chloro-pyrimidine and 2-phenylamino-4-ethylamino-6-chloro-pyrimidine, and reacting this mixture with excess β-hydroxyethylamine at a temperature of 140–150°.

Dyestuffs having similar properties are obtained when the equivalent amount of each of the diazo components given in column 2 of the following Table I is coupled with any of the mixtures of coupling components given in column 3.

TABLE I

| Ex. No. | Diazo component | Coupling component | Shade on polyglycol terephthalate fibres |
|---|---|---|---|
| 2 | 1-amino-2-cyano-4-nitrobenzene | 22 g. 2-methylamino-4-(4'-methylphenylamino)-6-β-hydroxyethylamino-pyrimidine. <br> 5.3 g. 2-(4'-methyl-phenylamino)-4-methylamino-6-β-hydroxyethylamino-pyrimidine. | Scarlet. |
| 3 | 1-amino-4-nitrobenzene | 19 g. 2-methylamino-4-(2'-methoxy-phenylamino)-6-β-hydroxyethylamino-pyrimidine. <br> 9.9 g. 2-(2'-methoxy-phenylamino)-4-methylamino-6-β-hydroxyethylamino-pyrimidine. | Do. |
| 4 | 2-amino-6-methoxy-benzothiazole | 21.4 g. 2-ethylamino-4-(2'-methoxy-5'-methylphenylamino)-6-β-hydroxyethylamino-pyrimidine. <br> 10.3 g. 2-(2'-methoxy-5'-methylphenylamino)-4-ethylamino-6-β-hydroxyethylamino-pyrimidine. | Do. |
| 5 | 4-amino-azobenzene | Same as above. | Red. |
| 6 | 1-amino-2,4-dinitro-6-chlorobenzene | 22 g. 2-methylamino-4-phenylamino-6-β-hydroxypropylamino-pyrimidine. <br> 5.3 g. 2-phenylamino-4-methylamino-6-β-hydroxypropylamino-pyrimidine. | Red. |
| 7 | do | 23 g. 2-isopropylamino-4-phenylamino-6-β-hydroxyethylamino-pyrimidine. <br> 5.7 g. 2-phenylamino-4-isopropylamino-6-β-hydroxyethylamino-pyrimidine. | Red. |
| 8 | do | 25.4 g. 2-γ-methoxypropylamino-4-phenylamino-6-β-hydroxyethylamino-pyrimidine. <br> 6.3 g. 2-phenylamino-4-γ-methoxypropylamino-6-β-hydroxyethylaminopyrimidine. | Red. |

Example 9

A fine suspension of 16.5 g. of 1-aminobenzene-4-carboxylic acid ethyl ester in 400 g. of water, 30 g. of 36% hydrochloric acid and 5 g. of cetyl polyglycol ether is diazotised in the usual way at 0–5° by the addition of 6.9 g. of sodium nitrite. The diazonium salt solution obtained is clarified and, at 5–10°, is added dropwise to a solution of a mixture of 21.8 g. of 2-ethylamino-4-phenylamino-6-β-hydroxyethylamino-pyramidine and 5.5 g. of 2-phenylamino - 4 - ethylamino-6-β-hydroxyethylamino-pyrimidine in 800 g. of 40% acetic acid. The pH of the mixture is then raised to 4–4.5 by the addition of sodium acetate. On completion of the coupling, the precipitated yellow coloured precipitate, the composition of which corresponds to the formulae:

is separated by filtration, washed with a large quantity of water and dried in vacuo at 60–70°. After milling with the sodium salt of a condensation product of naphthalene-2-sulphonic acid and formaldehyde, the dyestuffs so obtained dyes polyglycol terephthalate fibres from an aqueous dispersion, optionally in the presence of a carrier such as o-phenylphenol, in pure yellow shades. The dyebath is substantially exhausted. The dyeings have very good fastness to washing, rubbing, light and sublimation. Closely woven fabric and tightly twisted yarns are also well penetrated and evenly dyed.

Dyestuffs having similar properties are obtained when the equivalent amount of each of the diazo components given in column 2 of the following Table II is coupled with the mixture of coupling components used in the above example.

TABLE II

| Ex. No. | Diazo component | Coupling component | Shade on polyglycol terephthalate fibres |
|---|---|---|---|
| 10 | 1-amino-2,4-dichlorobenzene | 23 g. 2-ethylamino-4-phenylamino-6-β-hydroxyethylamino-pyrimidine <br> 4.3 g. 2-phenylamino-4-ethylamino-6-β-hydroxyethylamino-pyrimidine | Yellow. |
| 11 | 1-amino-2-nitrobenzene | Same as above | Yellowish orange. |
| 12 | 1-amino-2-nitro-4-methylbenzene | do | Orange. |
| 13 | 1-amino-2-nitro-4-methoxybenzene | do | Scarlet. |
| 14 | 1-amino-2-nitro-4-chlorobenzene | do | Reddish orange. |
| 15 | 1-amino-2-nitro-4-methylsulphonyl-benzene. | do | Scarlet. |
| 16 | 1-amino-2-chloro-4-nitrobenzene | do | Do. |
| 17 | 1-amino-2-methoxy-4-nitrobenzene | do | Red. |
| 18 | 1-amino-2,6-dichloro-4-nitrobenzene | do | Scarlet. |
| 19 | 1-amino-2,5-dichloro-4-nitrobenzene | do | Yellow-brown. |
| 20 | 1-amino-2-bromo-4-nitrobenzene | do | Scarlet. |
| 21 | 1-amino-2-cyano-4-nitrobenzene | do | Do. |
| 22 | 1-amino-4-methylsulphonyl-benzene | do | Yellow. |
| 23 | 1-aminobenzene-4-sulphonic acid-N-phenylamide. | do | Do. |
| 24 | 1-aminobenzene-4-sulphonic acid-dimethylamide. | do | Do. |
| 25 | 1-aminobenzene-4-carboxylic acid-propylamide. | do | Do. |
| 26 | 1-amino-4-acetylbenzene | do | Reddish yellow. |
| 27 | 2-amino-6-methoxy-benzothiazole | do | Scarlet. |
| 28 | 2-amino-6-cyano-benzothiazole | do | Do. |
| 29 | 2-amino-6-thiocyanobenzothiazole | do | Do. |
| 30 | 2-amino-6-methylsulphonyl-benzothiazole. | do | Scarlet. |
| 31 | 4-amino-2-methylquinoline | do | Do. |
| 32 | 6-amino-indazole | do | Yellow. |
| 33 | 3-amino-indazole | do | Do. |

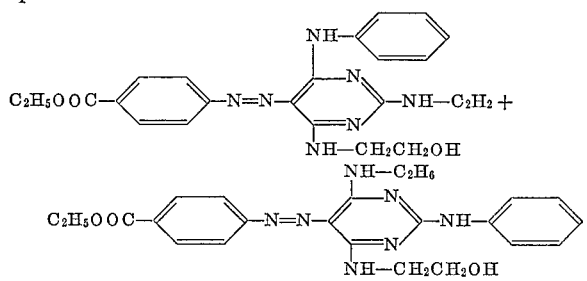

Example 34

13.8 g. of 1-amino-4-nitrobenzene are finely slurried in 400 g. of water and 30 g. of 36% hydrochloric acid with the addition of 5 g. of cetyl polyglycol ether and then diazotised in the usual way at 0–5° by the addition of 6.9 g. of sodium nitrite in 50 g. of water.

The diazonium salt solution obtained is clarified and, at 5–10°, is added dropwise to a solution of 24.2 g. of 2-ethyl-amino-4-(2'-methoxyphenylamino) - 6 - β-hydroxyethylamino - pyrimide and 6.1 g. of 2-(2'-methoxy-phenylamino)-4-ethylamino - 6 - β - hydroxyethylamino-pyrimidine in 500 g. of 80% acetic acid and 300 g. of water.

The coupling mixture formed is then buffered by the addition of sodium acetate. On completion of the coupling, the scarlet coloured precipitate formed, the composition of which corresponds to the formulae:

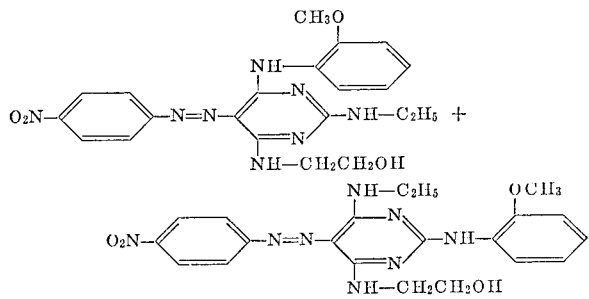

is separated by filtration, washed with water and then dried in the usual way. 10 g. of the dyestuff mixture so obtained are brought into a finely dispersable form by milling with 30 g. of a lignin sulphonate. Polyglycol terephthalate fibres can be dyed in pure scarlet shades with this dyestuff mixture, optionally in the presence of a carrier such as trichlorobenzene. The dyeings have very good fastness to rubbing, light and sublimation.

The mixture of 2 - ethylamino - 4 - (2' - methoxyphenylamino) - 6 - β - hydroxyethylamino - pyrimidine and 2 - (2' - methoxyphenylamino) - 4 - ethylamino - 6-β-hydroxyethylamino - pyrimidine used in this example as coupling component is obtained, e.g. by reacting 2,4,6-trichloro - pyrimidine with one equivalent of 1-amino-2-methoxybenzene at 40–50°, condensing the mixture of 4-(2'-methoxyphenylamino) - 2,6 - dichloro-pyrimidine and 2-(2'-methoxyphenylamino) - 4,6 - dichloro-pyrimidine resulting therefrom with excess ethylamine at 80–90° to form a mixture of 2 - ethylamino - 4-(2'-methoxyphenylamino) - 6 - chloro - pyrimidine and 2 - (2'-methoxyphenylamino) - 4 - ethylamino - 6 - chloro - pyrimidine and reacting this mixture with excess β-hydroxyethylamine at a temperature of 140–150°.

Dyestuffs having similar good properties are obtained when the equivalent amount of each of the diazo components given in column 2 of the following Table III is coupled with one of the coupling components or mixture of coupling components given in column 3.

salt solution obtained is added dropwise, at 0–10°, to a solution of a mixture of 24.2 g. of 2 - ethylamino - 4-(4'-methoxy - phenylamino) - 6 - β - hydroxyethylamino-pyrimidine and 6.1 g. of 2 - (4' - methoxyphenylamino)-2-ethylamino - 6 - β - hydroxyethylamino - pyrimidine in 500 g. of 80% acetic acid and 300 g. of water. The coupling mixture formed is then buffered by the addition of sodium acetate. On completion of the coupling, the dark red coloured precipitate formed, the composition of which corresponds to the formulae:

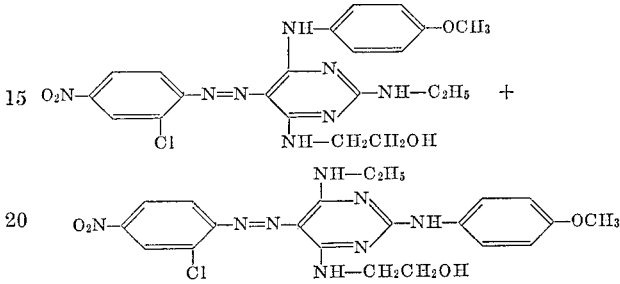

is separated by filtration, washed with a large quantity of water and dried under reduced pressure at 70–80°. 10 g. of the dyestuff mixture so obtained are brought into a finely dispersable form by milling with 20 g. of a lignin sulphonate. Polyglycol terephthalate fibres can be dye in pure red shades with this dyestuff mixture, optionally in the presence of a carrier such as o-phenylphenol. The dyeings have very good fastness to washing, rubbing, perspiration and sublimation.

The mixture of 2-ethylamino - 4 - (4'-methoxyphenylamino)-6-β-hydroxyethylamino - pyrimidine and 2 - (4'-methoxyphenylamino) - 4 - ethylamino - 6 - β - hydroxyethylamino-pyrimidine used in this example as coupling component is obtained, e.g. by reacting 2,4,6-trichloro-pyrimidine with one equivalent of 1-amino-4-methoxybenzene at 40–50°, condensing the mixture of 4-(4'-methoxy - phenylamino) - 2,6 - dichloro - pyrimidine and 2 - (4' - methoxy - phenylamino) - 4,6 - dichloro-pyrimidine resulting therefrom with excess ethylamine at 80–90° to form a mixture of 2-ethylamino-4-(4'-methoxy-phenylamino) - 6 - chloro-pyrimidine and 4 - ethylamino - 2-(4'-methoxy - phenylamino) - 6 - chloro-pyrimidine, and re-

TABLE III

| Ex. No. | Diazo component | Coupling component | Shade on polyglycol terephthalate fibres |
|---|---|---|---|
| 35 | 1-amino-2-chlorobenzene | 19.5 g. 2-amino-4-phenylamino-6-β-hydroxyethylamino-pyrimidine. <br> 4.9 g. 2-phenylamino-4-amino-6-β-hydroxyethylamino-pyrimidine. | Yellow. |
| 36 | 1-amino-4-nitrobenzene | Same as above. | Orange. |
| 37 | 1-aminobenzene-4-carboxylic acid methyl ester. | 24.3 g. 2-propylamino-4-(4'-hydroxyphenylamino)-6-β-hydroxyethylamino-pyrimidine. <br> 61.2 g. 2-(4'-hydroxyphenylamino)-4-propylamino-6-β-hydroxyethylamino-pyrimidine. | Reddish yellow. |
| 38 | do | 25.0 g. 2-butylamino-4-(4'-chlorophenylamino)-6-β-hydroxyethylamino-pyrimidine. <br> 8.4 g. 2-(4'-chlorophenylamino)-4-butylamino-6-β-hydroxyethylamino-pyrimidine. | Yellow. |
| 39 | 1-amino-2-cyano-4-nitrobenzene | 26.0 g. 2-cyclohexylamino-4-phenylamino-6-β-hydroxyethylamino-pyrimidine. <br> 6.7 g. 2-phenylamino-4-cyclohexylamino-6-β-hydroxyethylamino-pyrimidine. | Scarlet. |
| 40 | 1-amino-4-nitro-benzene | 26.8 g. 2-benzylamino-4-phenylamino-6-β-hydroxy-ethylaminopyrimidine. <br> 5.7 g. 2-phenylamino-4-benzylamino-6-β-hydroxyethylaminopyrimidine. | Reddish orange. |
| 41 | do | 22.5 g. 2-ethylamino-4-(2'methylphenylamino)-6-β-hydroxy-propylamino-pyrimidine. <br> 7.5 g. 2-(2'-methylphenylamino)-4-ethylamino-6-β-hydroxy-propylamino-pyrimidine. | Do. |
| 42 | do | 22.3 g. 2-ethylamino-4-phenylamino-6-δ-hydroxybutylaminopyrimidine. <br> 7.8 g. 2-phenylamino-4-ethylamino-6-δ-hydroxybutylaminopyrimidine. | Do. |
| 43 | 1-amino-2-chloro-4-nitrobenzene | 24.4 g. 2-ethylamino-4-phenylamino-6-β-hydroxy-γ-methoxy-propylamino-pyrimidine. <br> 6.2 g. 2-phenylamino-4-ethylamino-6-β-hydroxy-γ-methoxy-propylamino-pyrimidine. | Scarlet. |
| 44 | 1-aminobenzene-4-carboxylic acid methylamine. | 28.0 g. 2-ethylamino-4-phenylamino-6-β-hydroxy-β-phenylethylamino-pyrimidine. <br> 6.8 g. 2-phenylamino-4-ethylamino-6-β-hydroxy-β-phenylethylamino-pyrimidine. | Yellow. |
| 45 | 1-amino-2,4-dinitro-6-bromobenzene. | 2-ethylamino-4-phenylamino-6-β-hydroxy-ethylaminopyrimidine. | Red. |
| 46 | do | 2-β-hydroxyethylamino-4-phenylamino-6-ethylamino-pyrimidine. | Red. |
| 47 | 1-amino-2-nitro-4-methylbenzene | 24.5 g. 2-β-chloroethylamino-4-phenylamino-6-β-hydroxyethylamino-pyrimidine. <br> 6.2 g. 2-phenylamino-4-β-chloroethylamino-6-β-hydroxyethylamino-pyrimidine. | Orange. |
| 47a | 1-amino-2,4-dinitro-6-chlorobenzene. | 4-ethylamino-2-phenylamino-6-(β-hydroxy-ethylamino)-pyrimidine. | Red. |
| 47b | 1-amino-benzene-4-carboxylic acid phenylamide. | 4,6-bis-(γ-methoxy propylamino)-2-phenylaminopyrimidine. | Reddish-yellow. |

Example 48

A fine suspension of 17.3 g. of 1 - amino - 2 - chloro-4-nitrobenzene in 300 g. of water, 30 g. of 36% hydrochloric acid and 5 g. of cetyl polyglycol ether is diazotised at 0–5° by the dropwise addition of a solution of 6.9 g. of sodium nitrite in 50 g. of water. The clear diazonium acting this mixture with excess β-hydroxyethylamine at a temperature of 140–150°.

If in the above example, the mixture of 2-ethylamino-4-(4'-methoxyphenylamino) - 6 - β - hydroxyethylamino-pyrimidine and 2 - (4' - methoxyphenylamino) - 4 - ethylamino - 6 - β - hydroxyethylamino-pyrimidine used as coupling component is replaced by the same amount of a mixture of 2 - β - hydroxyethylamino - 4 - (4' - methoxyphenylamino) - 6 - ethylamino-pyrimidine and 2 - (4'-methoxyphenylamino) - 4 - β - hydroxy - ethylamino - 6-ethylamino-pyrimidine, then a dyestuff mixture is obtained which produces pure red dyeings having similarly good properties on polyester fibers.

Example 49

18 g. of 2-amino-6 methoxy-benzothiazole in 100 g. of concentrated sulphuric acid are diazotised for 3 hours at −5° with nitrosyl sulphuric acid, corresponding to 6.9 g. of sodium nitrite. The diazonium salt solution so obtained is added dropwise, at 0–5°, to a solution of 23 g. of 2-isopropylamino - 4 - phenylamino - 6 - β - hydroxyethylamino-pyrimidine and 5.7 g. of 2-phenylamino-4-isopropylamino - 6 - β - hydroxyethylamino-pyrimidine in 400 g. of 80% acetic acid and 250 g. of water. On completion of the coupling, 500 g. of water are added to the reaction mixture obtained. The precipitated scarlet dyestuff precipitate is then separated by filtration, washed with water and then dried in the usual way. 10 g. of the dyestuff mixture so obtained, the composition of which corresponds to the formulae:

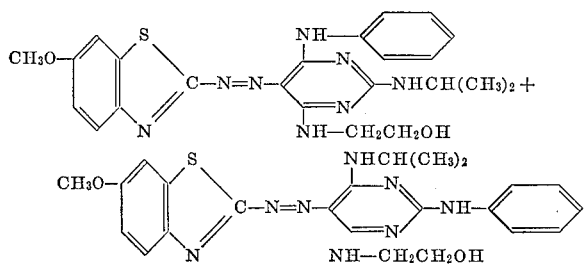

are brought into a finely dispersable form by milling with 20 g. of a lignin sulphonate. Polyglycol terephthalate fibres can be dyed in pure scarlet shades with this dyestuff mixture, optionally in the presence of a carrier such as trichlorobenzene. The dyeings have very good fastness to washing, perspiration, decatising, light and sublimation.

The mixture of 2-isopropylamino-4-phenylamino-6-β-hydroxyethylamino-pyrimidine and 2 - phenylamino - 4-isopropylamino - 6 - β - hydroxyethylamino-pyrimidine used in this example as coupling component is obtained, e.g. by reacting 2,4,6-trichloro-pyrimidine with one equivalent of aniline, condensing the mixture of 4-phenylamino-2,6-dichloro-pyrimidine and 2-phenylamino-4,6-dichloro-pyrimidine resulting therefrom with excess isopropylamine at 80–90° to form a mixture of 2-isopropylamino-4-phenylamino-6-chloro-pyrimidine and 2-phenylamino-4-isopropylamino-6-chloro-pyrimidine, and reacting this mixture with excess β-hydroxyethylamine at a temperature of 140–160°.

Example 50

A fine suspension of 19.7 g. of 4-amino-azobenzene in 500 g. of water, 75 g. of 36% hydrochloric acid and 5 g. of oleyl polyglycol ether is diazotised in the usual way at 15–20° by the addition of 6.9 g. of sodium nitrite. The diazonium salt solution formed is added dropwise, at 10–15°, to a solution of a mixture of 21.8 g. of 2-methylamino - 4 - phenylamino - 6 - γ - hydroxypropylamino-pyrimidine and 5.5 g. of 2-phenylamino-4-methylamino-6-γ-hydroxypropylamino-pyrimidine in 500 g. of 80% acetic acid and 400 g. of water. The pH of the reaction mixture obtained is then raised to 4–4.5 by the addition of sodium acetate. On completion of the coupling, the red coloured dyestuff precipitate formed, the composition of which corresponds to the formulae:

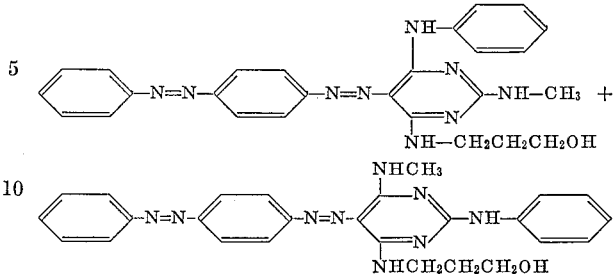

is separated by filtration, washed with water and dried in the usual way. 5 g. of the dyestuff mixture obtained in this way are brought into a finely dispersable form by milling with 12 g. of sodium salt of a condensation product of naphthalene-2-sulphonic acid and formaldehyde. Polyglycol terephthalate fibres dyed in pure scarlet shades are obtained with this dyestuff mixture by dyeing from aqueous dispersion, optionally in the presence of a carrier such as o-phenylphenol. The dyeings have very good fastness to washing, rubbing and perspiration.

The mixture of 2 - methylamino - 4-phenylamino-6-γ-hydroxypropylamino - pyrimidine and 2 - phenylamino-4-methylamino - 6 - γ - hydroxypropylamino - pyrimidine used in this example as coupling component is obtained, e.g. by reacting a mixture of 4-phenylamino-2,6-dichloropyrimidine and 2 - phenylamino - 4,6 - dichloro - pyrimidine with excess methylamine at 80–90° and condensation of the mixture of 2-methylamino-4-phenylamino-6-chloro - pyrimidine and 2 - phenylamino - 4 - methylamino - 6 - chloro - pyrimidine resulting therefrom with excess γ-hydroxypropylamine at a temperature of 140–160°.

If the mixture of 2-methylamino-4-phenylamino-6-γ-hydroxypropylamino-pyrimidine and 2-phenylamino - 4-methylamino-6-γ-hydroxypropylamino - pyrimidine used in the above example as coupling component is replaced by the same amount of a mixture of 2-β-hydroxypropylamino - 4 - phenylamino - 6 - methylamino - pyrimidine and 2 - phenylamino - 4 - β - hydroxypropylamino - 6-methylamino-pyrimidine, then a dyestuff mixture is obtained which produces pure scarlet dyeings having similarly good properties on polyglycol terephthalate fibres.

Example 51

21.8 g. of 1-amino-2,4-dinitro-6-chlorobenzene are dissolved in 200 g. of concentrated sulphuric acid and, at 20–30°, the solution is diazotised in the usual way with nitrosyl sulphuric acid. The diazonium salt solution is added dropwise, at 0.5°, to a solution of 37.3 g. of 4-phenylamino-2,6-bis-β-acetoxy-ethylamino-pyrimidine in 400 g. of 80% acetic acid, 250 g. of water and 200 g. of methyl alcohol. On completion of the coupling, the precipitated dark red coloured precipitate, the composition of which corresponds to the formula:

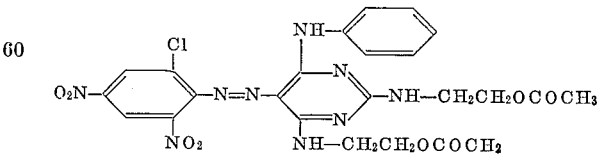

is filtered off, washed with water and then dried in the usual way. 10 g. of the dyestuff so obtained are brought into a finely dispersable form by milling with 20 g. of a lignin sulphonate.

Polyglycol terephthalate fibres can be dyed in pure red shades with this dyestuff preparation, optionally in the presence of a carrier such as o-phenyl-phenol. The dyeings obtained have very good fastness to washing, rubbing, light and sublimation.

The 4-phenylamino-2,6-bis-β-acetoxy-ethylamino-pyrimidine used in this example as coupling component is obtained, e.g. by reacting 4-phenylamino-2,6-dichloro-pyrimidine with excess ethanolamine at a temperature of 130–170° and then acetylating the resultant 4-phenylamino-2,6-bis-β-hydroxy-ethylamino-pyrimidine with acetahydride, preferably dissolved in chlorobenzene, at a temperature of 75–90°.

Dyestuffs having similar properties are obtained when the equivalent amount of each of the diazo components given in column 2 of the following Table IV is coupled with any of the, or a mixture of the, coupling components given in column 3.

tion product of naphthalene-2-sulphonic acid and formaldehyde. Polyglycol terephthalate fibres can be dyed in pure scarlet shades with this preparation, optionally in the presence of a carrier such as trichlorobenzene. The dyebath is substantially exhausted. The dyeings have very good fastness to rubbing, light and sublimation. The mixture consisting of 2-methylamino-4-phenylamino-6-γ-methoxy-propylamino-pyrimidine and 2-phenylamino-4-methylamino-6-γ-methoxy-propylamino-pyrimidine used in this example as coupling component is obtained, e.g. by reacting a mixture of 4-phenylamino-2,6-dichloro-pyrimidine

TABLE IV

| Ex. No. | Diazo component | Coupling component | Shade on polyglycol terephthalate fibres |
|---|---|---|---|
| 52 | 1-amino-4-nitrobenzene | 2-amino-4-(2'-methylphenylamino)-6-(β-propoxy-ethylamino)-pyrimidine | Yellowish orange. |
| 53 | 1-amino-2-cyano-4-nitrobenzene | 2-ethylamino-4-phenylamino-6-(γ-acetoxy-propylamino)-pyrimidine | Scarlet. |
| 54 | 1-amino-2-chloro-4-nitrobenzene | 2-methylamino-4-(4'methoxyphenylamino)-6-(β-acetoxy-propylamino)-pyrimidine | Do. |
| 55 | 1-amino-2-nitrobenzene | 2-methylamino-4-phenylamino-6-(β-butoxy-ethylamino)-pyrimidine | Yellowish orange. |
| 56 | 1-amino-4-methyl-sulphonylbenzene | 2-(β-acetoxyethylamino)-4-phenylamino-6-(β-hydroxyethylamino)-pyrimidine | Yellow. |
| 57 | 1-amino-2,4-dinitrobenzene | {32 g. 4-phenylamino-2,6-(bis-β-acetoxy-ethylamino)-pyrimidine<br>{5.3 g. 2-phenylamino-4,6-(bis-β-acetoxy-ethylamino)-pyrimidine | } Red. |
| 58 | 1-amino-2,4-dinitro-6-chlorobenzene | Same as above | Red. |
| 59 | 1-amino-2,4-dinitro-6-bromobenzene | do | Red. |
| 60 | 2-amino-6-methoxy-benzothiazole | do | Scarlet. |
| 61 | 1-amino-4-nitrobenzene | 2-ethylamino-4-phenylamino-6-β-hydroxy-ethoxy-propylamino-pyrimidine | Do. |
| 62 | do | 2-ethylamino-4-phenylamino-6-β-cyclohexyloxy-ethylamino-pyrimidine | Do. |
| 63 | do | 2-ethylamino-4-phenylamino-6-β-4'-methylphenoxy-ethylamino-pyrimidine | Do. |
| 64 | 1-amino-4-nitrobenzene | 2-ethylamino-4-(2'-bromophenylamino)-6-β-hydroxyethylamino-pyrimidine | Do. |
| 65 | do | 2-ethylamino-4-(4'-cyanophenylamino)-6-β-hydroxyethylamino-pyrimidine | Do. |
| 66 | 1-amino-2,4-dinitro-6-clorobenzene | {4.3 g. 2-ethylamino-4-phenylamino-6-β-hydroxyethylamino-pyrimidine<br>{23 g. 2-phenylamino-4-ethylamino-6-β-hydroxyethylamino-pyrimidine | } Red. |
| 67 | 1-amino-4-nitrobenzene | Same as above | Scarlet. |
| 68 | 1-amino-2-chloro-4-nitro-benzene | do | Do. |
| 69 | 2-amino-6-methoxy-benzothiazole | do | Do. |
| 70 | do | {6.1 g. 2-ethylamino-4-(2'-methoxyphenylamino)-6-β-hydroxyethylamino-pyrimidine<br>{24.2 g. 2-(2'-methoxyphenylamino)-4-ethylamino-6-β-hydroxyethylamino-pyrimidine | } Do. |
| 71 | 1-amino-4-nitrobenzene | do | Do. |
| 72 | do | {5.3 g. 4-phenylamino-2,6-(bis-β-acetoxy-ethylamino)-pyrimidine<br>{32 g. 2-phenylamino-4,6-(bis-β-acetoxy-ethylamino)-pyrimidine | } Do. |

Example 73

18 g. of 2-amino-6-methoxy-benzothiazole in 100 g. of concentrated sulphuric acid are diazotised for 3 hours at $-5°$ with nitrosyl sulphuric acid, corresponding to 6.9 g. of sodium nitrite. The diazonium salt solution so obtained is added dropwise, at 0–5°, to a solution of a mixture consisting of 24.4 g. of 2-methylamino-4-phenylamino-6-γ-methoxy-propylamino-pyrimidine and 4.3 g. of 2-phenylamino-4-methylamino-6-γ-methoxy - propylamino-pyrimidine in 500 g. of 80% sulphuric acid and 300 g. of water. On completion of the coupling, the precipitated and 2-phenylamino-4,6-dichloro-pyrimidine with excess methylamine at 80–90° to form a mixture of 2-methylamino-4-phenylamino-6-chloro-pyrimidine and 2-phenylamino-4-methylamino-6-chloro-pyrimidine and reacting this mixture with excess γ-methoxypropylamine at a temperature of 140–150°.

Dyestuffs having similar good properties are obtained when the equivalent amount of each of the diazo components given in column 2 of the following Table V are coupled with one of the, or with a mixture of the, coupling components given in column 3.

TABLE V

| Ex. No. | Diazo component | Coupling component | Shade on polyglycol terephthalate fibres |
|---|---|---|---|
| 74 | 1-amino-2-cyano-4-nitrobenzene | 2-cyclohexylamino-4-(4'-methylphenylamino)-6-(γ-methoxyethoxypropylamino)-pyrimidine | Scarlet. |
| 75 | 1-amino-4-nitrobenzene | 2-propylamino-4-phenylamino-6-(β-phenoxy-ethylamino)-pyrimidine | Orange. |
| 76 | do | 2-methylamino-4-(2'-methoxyphenylamino)-6-(γ-benzyloxy-propylamino)-pyrimidine | Do. |
| 77 | 1-amino-2,4-dinitrobenzene | 2-(γ-methoxy-propylamino)-4-phenylamino-6-ethylamino-pyrimidine | Red. |
| 78 | 1-amino-2,4-dinitro-6-chlorobenzene | {26.7 g. 2-propylamino-4-phenylamino-6-(γ-methoxy-propylamino)-pyrimidine<br>{4.8 g. 2-phenylamino-4-propylamino-6-(γ-methoxy-propylamino)-pyrimidine | } Red. | red coloured precipitate, the composition of which corresponds to the formulas:

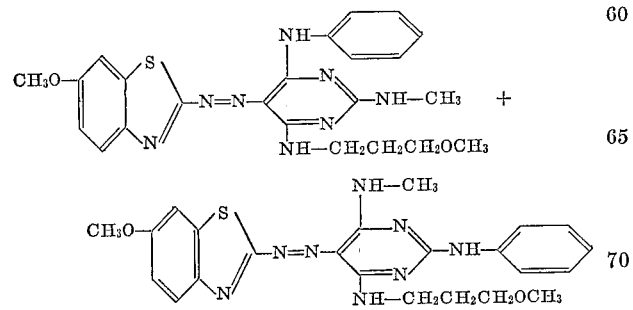

is filtered off, washed with water and then dried in the usual way. 10 g. of the dyestuff mixture so obtained are finely milled with 25 g. of the sodium salt of a condensa-

Example 79

45.2 g. of the dyestuff mixture produced according to example 34, the composition of which corresponds to the formulae:

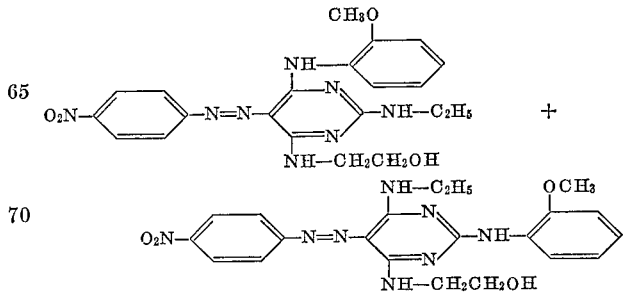

are slurried in 250 g. of glacial acetic acid. 20 g. of the acetanhydride are then added to the fine suspension and the whole is heated for 2 hours at 70–85°. 40 g. of methyl alcohol are then added to remove excess acetanhydride and the reaction mixture is kept for another 2 hours at 50–60°. The acetylated dyestuff mixture, the composition of which corresponds to the formulae

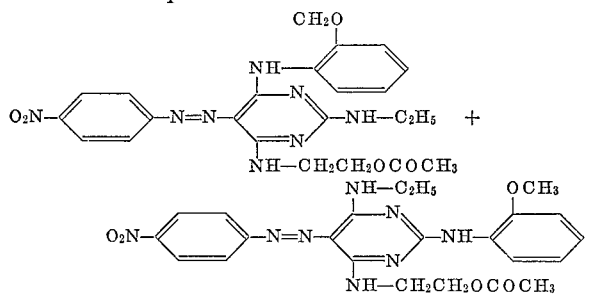

is then completely precipitated by the addition of 250 g. of water, filtered off, washed with water and dried in the usual way at 60–70° under reduced pressure. 10 g. of the dyestuff mixture so obtained are brought into a finely dispersable form by milling with 20 g. of a lignin sulphonate.

Polyglycol terephthalate fibres can be dyed in pure scarlet shades with this preparation, optionally in the presence of a carrier such as o-phenylphenol. The dyeings obtained have very good fastness to washing, rubbing, light and sublimation.

Dyestuffs having similar properties as the dyestuff obtained by the procedure described in Example 9, are obtained by repeating the latter example, but using as diazo component an equivalent amount of a diazonium salt obtained by diazotizing in a conventional manner each of the amines given in the second column of the following Table VI, and coupling the said diazonium salt with one of the coupling components listed in the third column of Table VI. The resulting dyestuffs dye polyethyleneglycol terephthalate fibers in the shades given in the last column of that table.

Example 104d 42.3 g. of the mixture of dyestuffs produced according to Example 104a, the composition of which corresponds to the formulae:

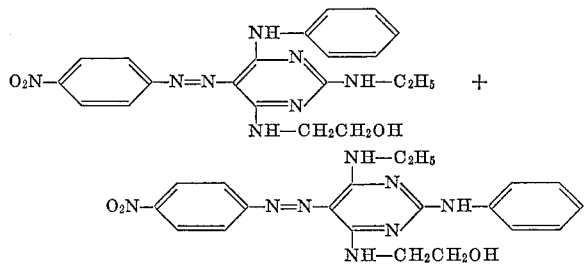

are slurried in 400 g. of dioxane. 10 g. of magnesium oxide and 13 g. of benzoyl chloride are added to the fine suspension which is then heated for 8 hours at 90–95°. The hot dyestuff solution is then clarified, the dioxane is removed with steam and, after cooling, the water is decanted. The benzoylated dystuff is then taken up in 2500 g. of hot methyl alcohol whereupon the mixture of dyestuffs, the composition of which corresponds to the formulae:

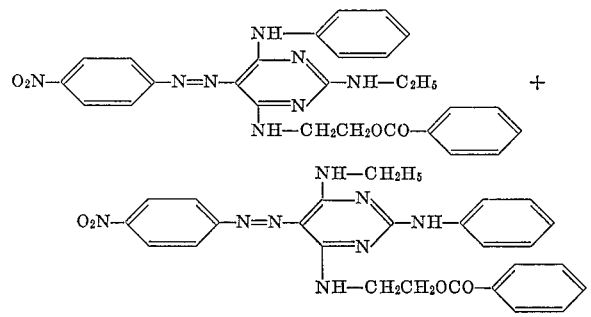

TABLE VI

| Ex. No. | Diazo component | Coupling component | Shade on polyglycol terephthalate fibers |
|---|---|---|---|
| 80 | 1-amino-3-nitro-4-fluoro-benzene | 2-ethylamino-4-phenylamino-6-β-hydroxyethylaminopyrimidine | Yellowish orange. |
| 81 | 1-amino-4-trifluoromethyl-benzene | do | Yellow. |
| 82 | 1-amino-4-benzoylbenzene | do | Do. |
| 83 | 1-amino-4-phenyl sulfonyl-benzene | do | Do. |
| 84 | 1-amino-4-(4'-methylphenyl)-sulfonylbenzene | do | Do. |
| 85 | 1-amino-2-nitro-benzene-4-sulfonic acid-phenylester | do | Scarlet. |
| 86 | 1-amino-2-nitro-benzene-4-sulfonic acid-4'-methylphenyl-ester | do | Do. |
| 87 | 1-amino-4-β-hydroxyethoxy-carbonyl-benzene | do | Yellow. |
| 88 | 1-amino-4-sulfamoylbenzene | do | Do. |
| 89 | 1-amino-2-nitrobenzene-4-sulfonic acid-N-methyl-N-β-hydroxyethyl-amide | do | Scarlet. |
| 90 | 1-amino-2-nitro-benzene-4-sulfonic acid-γ-methoxy propyl-amide | do | Do. |
| 91 | 1-amino-2-nitro-benzene-4-sulfonic acid-cyclo-hexylamide | do | Do. |
| 92 | 1-amino-2-nitro-benzene-4-sulfonic acid-N-benzyl-N-β-hydroxyethyl-amide | do | Do. |
| 93 | 1-amino-2-nitrobenzene-4-carboxylic acid-β-hydroxyethylamide | do | Do. |
| 94 | 1-amino-benzene-4-carboxylic acid-γ-methoxypropylamide | do | Yellow. |
| 95 | 1-amino-benzene-4-carboxylic acid-N-phenyl-N-methyl amide | do | Do. |
| 96 | 1-amino-benzene-4-carboxylic acid-cyclo-hexylamide | do | Do. |
| 97 | 1-amino-2-nitrobenzene-4-carboxylic acid-N-benzyl-N-β-hydroxyethyl-amide | do | Scarlet. |
| 98 | 1-amino-2-nitro-4-phenoxy-benzene | do | Red. |
| 99 | 2-amino-benzo-thiazole | do | Orange. |
| 100 | 2-amino-6-chlorobenzo-thiazole | do | Scarlet. |
| 101 | 2-amino-6-bromobenzo-thiazole | do | Do. |
| 102 | 2-amino-6-nitrobenzothiazole | 2-ethylamino-4-phenylamino-6-β-hydroxyethylaminopyrimidine | Do. |
| 103 | 2-amino-6-methylbenzo-thiazole | do | Orange. |
| 104 | 2-amino-4-benzothiazole-6-sulfonic acid-dimethylamide | do | Scarlet. |
| 104a | 1-amino-4-nitrobenzene | {23 g. 2-ethylamino-4-phenylamino-6-β-hydroxyethylamino-pyrimidine  4.3 g. 2-phenylamino-4-ethylamino-6-βhydroxyethylamino-pyrimidine} | Do. |
| 104b | 1-amion-2-methyl-4-nitrobenzene | do | Do. |
| 104c | 1-amino-2-nitro-benzene | do | Yellowish-orange. | precipitates in crystalline form during cooling. This precipitate is then filtered off and dried in the usual way. 10 g. of the mixture of dyestuffs so obtained is brought into a finely dispersible form by milling with 20 g. of a lignin sulphonate.

Polyglycol terephthalate fibres can be dyed in pure orange shades with this preparation, optionally in the presence of a carrier such as o-phenylphenol. The dyeings obtained have very good fastness to rubbing, light and sublimation.

Dyestuffs having similarly good properties are obtained if, in the above Example 104d, instead of 13 g. of benzoyl chloride, the equivalent amount of either propionic acid chloride, butyric acid chloride, chloroformic acid methyl or ethyl ester, benzene sulphonic acid chloride or p-toluene sulphonic acid chloride is used.

Example 105

Polyglycol terephthalate fabric (such as Dacron) is impregnated in a padding mangle at 40° with a liquor of the following composition:

20 parts by weight of the dyestuff obtained according to example 34, finely dispersed in
7.5 parts by weight of sodium alginate
20 parts by weight of triethanolamine
20 parts by weight of octylphenol-polyglycol ether and
900 parts by weight of water.

The fabric, squeezed out to a content of about 100% impregnation liquor, is dried at 100° and then fixed for 30 seconds at a temperature of 210°. The dyed goods are rinsed with water, soaped and dried. Under these conditions, a scarlet dyeing as obtained which is fast to washing, rubbing, light and sublimation.

The dyestuffs described in the other examples produce dyeings of equal quality by this process.

Example 106

In an apparatus for dyeing under pressure, 2 g. of the dyestuff obtained according to Example 58 are finely suspended in 2000 g. of water which contains 4 g. of oleyl polyglycol ether. The pH of the dye bath is adjusted to 5–5.5 with acetic acid.

100 g. of polyglycol terephthalate fabric are then introduced at 50°, the bath is heated to 140° within 30 minutes and dyeing is performed for 50 minutes at this temperature. The dyeing is then rinsed with water, soaped and dried. On keeping these conditions, a pure red dyeing is obtained which is fast to washing, perspiration, light and sublimation.

The dyestuffs described in the other examples produce dyeings of equal quality by this process.

Example 107

2 g. of the dyestuff obtained according to Example 1 are dispersed in 4000 g. of water. 12 g. of sodium-o-phenylphenolate are added to this dispersion as carrier and also 12 g. of diammonium phosphate are added. 100 g. of polyglycol terephthalate yarn are dyed for 1½ hours at 95–98°. The dyeing is rinsed and after-treated with dilute sodium hydroxide solution and a dispersing agent.

In this way a pure red dyeing which is fast to washing, light and sublimation is obtained.

If in the above example, the 100 g. of polyglycol terephthalate yarn are replaced by 100 g. of cellulose triacetate fabric, dyeing is performed under the conditions given and then the dyeing is rinsed with water, then a red dyeing having a very good fastness to washing and sublimation is obtained.

The individual isomers of pyrimidine coupling components are produced by a procedure described in the following examples:

Example 108

(a) 93 g. of aniline are suspended in a mixture of 400 g. of water and 200 ml. of acetone, and 8 g. of anhydrous sodium acetate are added dropwise thereto; 183.4 g. of 2,4,6-trichloro-pyrimidine dissolved in 200 ml. of acetone are then added dropwise and, while maintaining the reaction mixture at a temperature of 50–55°, 40 g. of sodium hydroxide dissolved in 160 g. of water are added at such a rate that the pH of the reaction mixture remains between 5 and 6 throughout the addition of the trichloropyrimidine. Stirring is then continued at the same temperature range for 4 hours, whereupon the acetonic phase formed is separated from the supernatant aqueous phase, and the acetonic phase is then evaporated to dryness.

The residue consists of a mixture of 85% by weight of 4-phenylamino-2,6-dichloro-pyrimidine and 15% by weight of 2-phenylamino-4,6-dichloro-pyrimidine; it is then dissolved in 500 ml. of 80°-warm benzene, and, upon cooling, 56.4 g. of the 4-phenylamino isomer crystallize (M.P. 135–136°).

The mother liquor is then evaporated to dryness and redissolved in 280 ml. of benzene having a temperature of 80°. Upon cooling, another 101 g. of 4-phenylamino-2,6-dichloropyrimidine (M.P. 135–136°) crystallize. The final mother liquor separated from the crystals, can then be used for isolating the 2-phenylamino isomer therefrom. The second batch of crystals of the 4-phenylamino isomer obtained is still sufficiently pure to be used together with the first batch in the production of azo dyestuff coupling components therefrom on an industrial scale.

(b) 48 g. of 4-phenylamino-2,6-dichloro-pyrimidine obtained from step (a) are dissolved in 100 g. of dioxan, and 160 g. of water are added to the solution; to the resulting suspension there are added 30 g. of ethylamine in 30 g. of water, the reaction mixture is then heated to 85–90° during 6 hours with stirring, and stirring is continued while the mixture cools down to room temperature. Technically pure 4-phenylamino-2-ethylamino - 6 - chloro - pyrimidine having a melting point of about 90° precipitates and is separated by filtration and dried.

(c) 50 g. of the latter product are mixed with 30 g. of undiluted 2-amino-ethanol, and the mixture is heated with stirring at 140–150° for 2 hours. 4-phenylamino-2-ethylamino - 6 - ($\beta$-hydroxyethylamino)-pyrimidine of syrupy consistency is obtained which can be used directly as coupling component in the production of dyestuffs according to the invention.

Example 109

(a) The second mother liquor obtained as described under (a) in Example 108 is evaporated to dryness and a residue of 43.1 g. of crude 2-phenylamino-4,6-dichloropyrimidine (M.P. 90–91°) is obtained.

5 g. of this crude product are dissolved in 20 ml. of benzene and chromatographed on a 20 cm. x 5 cm. alumina column. The pure 2-phenylamino-4,6-dichloropyrimidine is eluted with benzene/chloroform (volume ratio 1:1) as eluting agent. It has a melting point of 111–112°.

(b) Step (b) of Example 108 is then repeated, but using 48 g. of 2-phenylamino-4,6-dichloro-pyrimidine as starting material, and, since the desired product does not precipitate, it is necessary to subject the reaction mixture to steam distillation. An orange-colored resin is obtained which is dissolved in four times its amount (about 120 ml.) of ethanol at 80°. Upon cooling, 30 g. of purified 2 - phenylamino - 4 - ethylamino - 6 - chloro-pyrimidine crystallizes. It is separated by filtration and dried, and has a melting point of 103–104°.

(c) Step (c) of Example 108 is repeated with this intermediate and a brown-colored syrupy product consisting of 2-phenylamino-4-ethylamino-6-($\beta$-hydroxyethylamino)pyrimidine is obtained which can be used directly as coupling component in each of the preceding examples, in lieu of the coupling components used therein.

Example 110

Step (a) of Example 108 is repeated, but in lieu of 93 g. of aniline, there are used 61 g. of 2-amino-ethanol;

from the resulting mixture of two isomers, the 2-(β-hydroxyethylamino3-4,6-dichloro-pyrimidine is ilsoated, and steps (b) and (c) of Example 109 are then repeated but using aniline in lieu of 2-amino-ethanol in step (c).

2 - (β - hydroxyethylamino) - 4 - phenylamino - 6 - ethylamino-pyrimidine is obtained which can be used as coupling component in the preceding Examples 1 to 104 in lieu of the coupling components used therein.

For instance, by repeating the procedure of Example 1, in which the diazonium compound from 1-amino-2,4-dinitro-6-chloro-benzene is used as diazo component, and employing as coupling component therein the above-described pyrimidine, there is obtained the dyestuff of the formula:

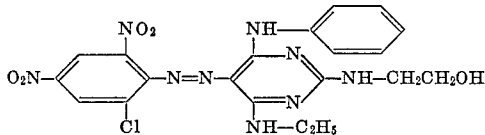

which dyes polyethyleneglycol terephthalate fibers in pure red shades of good all round fastness properties.

We claim:

1. A monoazo dyestuff of the formula:

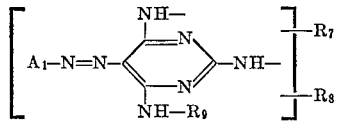

wherein $A_1$ represents:
  (a) a phenyl radical substituted as follows:
    (i) by a first substituent selected from nitro, cyano, fluorine, chlorine, bromine, trifluoromethyl, lower alkanoyl, benzoyl, lower alkylsulfonyl, phenylsulfonyl, lower alkylphenyl-sulfonyl, phenoxysulfonyl, lower alkylphenoxysulfonyl, lower-alkoxycarbonyl, hydroxy-lower alkovycarbonyl, or a substituent of the formula:

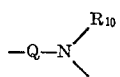

wherein Q represents —$SO_2$— or

—CO—

$R_{10}$ represents hydrogen, lower alkyl, hydroxy-lower alkyl, lower alkoxy-lower alkyl, phenyl, cyclohexyl or benzyl, and $R_{11}$ represents hydrogen, lower alkyl or hydroxy-lower alkyl;
    (ii) by a second substituent selected from hydrogen, nitro, chlorine, bromine, lower alkyl, lower alkoxy and phenoxy; and
    (iii) by a third substituent selected from hydrogen, chlorine and bromine;
  (b) a benzothiazolyl-(2) radical which is unsubstituted or substituted by chlorine, bromine, nitro, cyano, thiocyano, lower alkyl, lower alkylsulfonyl, or a grouping

wherein $R_{10}$ and $R_{11}$ represents lower alkyl, $R_7$ represents phenyl having substituents selected from hydrogen, lower alkyl, lower alkoxy, chlorine, bromine and cyano;
one of $R_8$ and $R_9$ represents alkyl of from 2 to 5 carbon atoms substituted by the group —O—$R_{12}$ which group represents hydroxy, lower alkoxy, lower alkoxy-lower alkoxy, hydroxy-lower alkoxy, cyclohexyloxy, phenyl-lower alkoxy, phenoxy, lower alkyl-phenoxy, alkanoyloxy of from 2 to 5 carbon atoms, benzoyloxy, lower alkoxycarbonyloxy, phenyl-sulfonyloxy or lower alkyl-phenylsulfonyloxy, and
the other one of $R_8$ and $R_9$ represents the same as the first one defined, supra, or hydrogen, lower alkyl, cyclohexyl or phenyl-lower alkyl.

2. A monoazo dyestuff as claimed in claim 1, wherein:
$A_1$ represents a phenyl radical as defined under (a) one of the said first and second substituents of which is in o- and the other in p-position to the adjoining azo bridge.

3. A monoazo dyestuff as defined in claim 1, wherein:
$A_1$ represents a benzothiazolyl radical as defined under (b).

4. A monoazo dyestuff as defined in claim 2, wherein $A_1$ is of the formula:

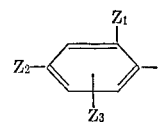

wherein one of $Z_1$ and $Z_2$ represents nitro,
the other of these Z represents hydrogen, nitro, cyano, chlorine, bromine, lower alkyl-sulfonyl or lower alkoxycarbonyl, and
$Z_3$ represents hydrogen, chlorine or bromine.

5. A monoazo dyestuff as defined in claim 4, wherein $A_1$ represents:

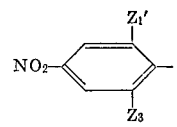

wherein:
$Z_1'$ represents hydrogen, nitro, cyano, chlorine or bromine, and
$Z_3$ has the foresaid meaning.
$R_7$ represents phenyl having substituents selected from hydrogen, lower alkyl and lower alkoxy,
one of $R_8$ and $R_9$ represents lower alkyl substituted by hydroxy, lower alkoxy or alkanoyloxy of from 2 to 5 carbon atoms, and
the other R of the pair of $R_8$ and $R_9$ represents optionally substituted lower alkyl, any substituent of which is selected from lower alkoxy and alkanoyloxy of from 2 to 5 carbon atoms.

6. A monoazo dyestuff as defined in claim 3, wherein:
$R_7$ represents phenyl having substituents selected from hydrogen, lower alkyl and lower alkoxy,
one of $R_8$ and $R_9$ represents lower alkyl substituted by hydroxy, lower alkoxy, or alkanoyloxy of from 2 to 5 carbon atoms, and
the other R of the pair of $R_8$ and $R_9$ represents lower alkyl which is unsubstituted or substituted by lower alkoxy or alkanoyloxy of from 2 to 5 carbon atoms.

7. A monoazo dyestuff as defined in claim 5, wherein $R_7$ represents hydrogen, methyl or methoxy.

8. A monoazo dyestuff as defined in claim 6, wherein $R_7$ represents hydrogen, methyl or methoxy.

9. A dye consisting of a mixture of a first dyestuff of the formula:

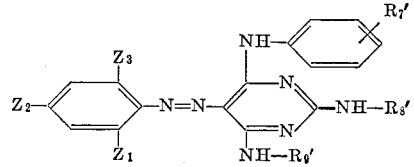

and a second dyestuff of the formula:

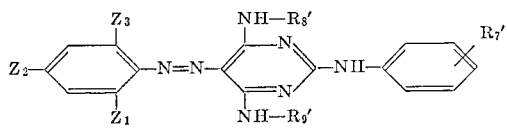

wherein:
of $Z_1$, $Z_2$ and $Z_3$, one Z represents the nitro group, a second Z represents hydrogen, the nitro, cyano, methylsulfphonyl or ethylsulphonyl group, chlorine or bromine, and the third Z represents hydrogen, chlorine or bromine, $R_7'$ represents hydrogen, the methyl or methoxy group, and, one of $R_8'$ and $R_9'$ represents alkyl of from 2 to 5 carbon atoms substituted by the group —O—$R_{12}$ which group represents hydroxy, lower alkoxy or alkanoyloxy of from 2 to 5 carbon atoms.

and the other one of $R_8'$ and $R_9'$ represents lower alkyl, which is unsubstituted or substituted by alkanoyloxy of from 2 to 5 carbon atoms or lower alkoxy.

the weight ratio of said first to said second dyestuff ranging from about 10:1 to about 1:10.

10. A disazo dyestuff of the formula:

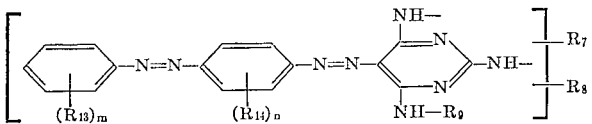

wherein:
$R_7$ represents phenyl having substituents selected from hydrogen, lower alkyl, lower alkoxy, chlorine, bromine and cyano;

one of $R_8$ and $R_9$ represents alkyl of from 2 to 5 carbon atoms substituted by the group —O—$R_{12}$ which group represents hydroxy, lower alkoxy, lower alkoxy-lower alkoxy, hydroxy-lower alkoxy, cyclohexyloxy, phenyl-lower alkoxy, phenoxy, lower alkyl-phenoxy, alkanoyloxy of from 2 to 5 carbon atoms, benzoyloxy, lower alkoxycarbonyloxy, phenyl-sulfonyloxy, or lower alkyl-phenyl-sulfonyloxy, and the other one of $R_8$ and $R_9$ represents the same as the first one defined, supra, or hydrogen, alkyl of from 1 to 12 carbon atoms, cyclohexyl or phenyl-lower alkyl, each of $R_{13}$ and $R_{14}$ represents hydrogen, lower alkyl, or lower alkoxy, $m$ represents a number from 1 to 3,
$n$ represents a number from 1 to 2.

11. A dyestuff as defined in claim 9, which consists of a mixture of the two isomers defined by the formula:

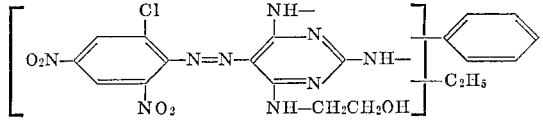

12. A dyestuff as defined in claim 9, which consists of a mixture of the two isomers defined by the formula:

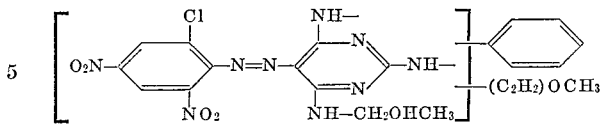

13. A dyestuff as defined in claim 9, which consists of a mixture of the two isomers defined by the formula:

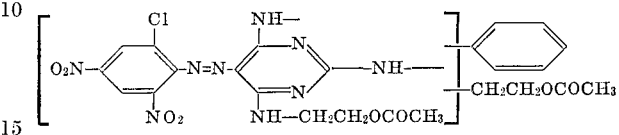

14. A dyestuff as defined in claim 9, which consists of a mixture of the two isomers defined by the formula:

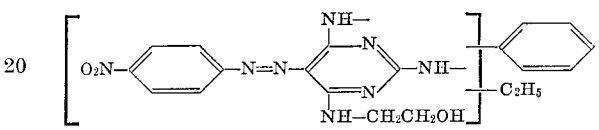

15. A dyestuff as defined in claim 9, which consists of a mixture of the two isomers defined by the formula:

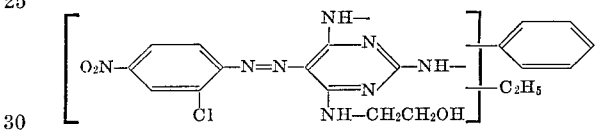

16. A dyestuff as defined in claim 9, which consists of a mixture of the two isomers defined by the formula:

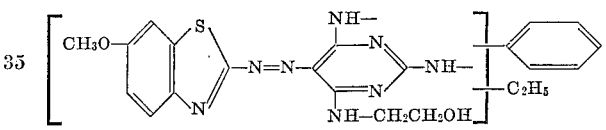

17. A dyestuff as defined in claim 9, which consists of a mixture of the two isomers defined by the formula:

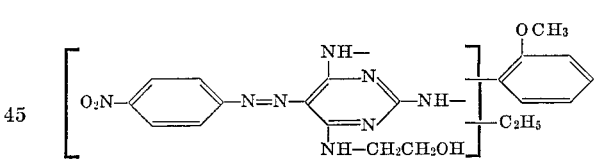

References Cited
UNITED STATES PATENTS 3,042,648  7/1962  Lewis _____ 260—154

CHARLES B. PARKER, Primary Examiner

D. M. PAPUGA, Assistant Examiner

U.S. Cl. X.R.

8—26, 41, 50, 55; 260—256.4, 256.5